(12) United States Patent
Kotov et al.

(10) Patent No.: US 10,651,449 B2
(45) Date of Patent: May 12, 2020

(54) DENDRITE-SUPPRESSING ION-CONDUCTORS FROM ARAMID NANOFIBERS WITHSTANDING EXTREME BATTERY CONDITIONS

(71) Applicant: THE REGENTS OF THE UNIVERSITY OF MICHIGAN, Ann Arbor, MI (US)

(72) Inventors: Nicholas A. Kotov, Ann Arbor, MI (US); Siu-On Tung, Ann Arbor, MI (US); Szu-Shen Ho, Ann Arbor, MI (US); Samantha Rahmani, Canton, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 166 days.

(21) Appl. No.: 15/120,301

(22) PCT Filed: Feb. 19, 2015

(86) PCT No.: PCT/US2015/016675
§ 371 (c)(1),
(2) Date: Aug. 19, 2016

(87) PCT Pub. No.: WO2015/127115
PCT Pub. Date: Aug. 27, 2015

(65) Prior Publication Data
US 2017/0062786 A1    Mar. 2, 2017

Related U.S. Application Data (60) Provisional application No. 61/941,785, filed on Feb. 19, 2014.

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/162* (2013.01);
(Continued)

(58) Field of Classification Search
CPC .... H01M 2/1686; H01M 2/145; H01M 2/162; H01M 8/188; H01M 8/20; H01M 10/0525
See application file for complete search history.

(56) References Cited

U.S. PATENT DOCUMENTS 5,879,828 A    3/1999  Debe et al.
6,136,412 A   10/2000  Spiewak et al.
(Continued)

FOREIGN PATENT DOCUMENTS

CN    101838888 A    9/2010
CN    101867030 A   10/2010
(Continued)

OTHER PUBLICATIONS

Machine translation of CN 101867030.*
(Continued)

Primary Examiner — Jonathan G Jelsma
(74) Attorney, Agent, or Firm — Lempia Summerfield Katz LLC (57) ABSTRACT

Ion conducting membranes based on aramid nanofibers (ANFs) can be prepared using layer-by-layer assembly, sol-gel processing, evaporation, spin coating, doctor blading, or other methods. Porosity is controlled through choice of additives and processing.

13 Claims, 7 Drawing Sheets

(51) Int. Cl.

| | | |
|---|---|---|
| *H01M 8/18* | (2006.01) | |
| *H01M 10/052* | (2010.01) | |
| *H01M 4/38* | (2006.01) | |
| *H01M 10/0585* | (2010.01) | |
| *H01M 8/20* | (2006.01) | |
| *H01M 10/0525* | (2010.01) | |

(52) U.S. Cl.
CPC .......... *H01M 4/382* (2013.01); *H01M 8/188* (2013.01); *H01M 8/20* (2013.01); *H01M 10/052* (2013.01); *H01M 10/0525* (2013.01); *H01M 10/0585* (2013.01); *Y02E 60/528* (2013.01); *Y02T 10/7011* (2013.01)

(56) References Cited

U.S. PATENT DOCUMENTS

| | | | |
|---|---|---|---|
| 6,319,293 B1 | 11/2001 | Debe et al. | |
| 7,820,321 B2* | 10/2010 | Home | B60L 11/1824 |
| | | | 429/120 |
| 2002/0192441 A1 | 12/2002 | Kalkan et al. | |
| 2005/0053826 A1 | 3/2005 | Wang et al. | |
| 2008/0020923 A1 | 1/2008 | Debe et al. | |
| 2010/0233523 A1 | 9/2010 | Jo | |
| 2011/0288199 A1* | 11/2011 | Lowman | A61F 2/3872 |
| | | | 523/114 |
| 2013/0017432 A1* | 1/2013 | Roumi | H01M 2/1686 |
| | | | 429/145 |
| 2013/0288050 A1 | 10/2013 | Arruda et al. | |
| 2013/0327702 A1* | 12/2013 | Wu | B01D 69/10 |
| | | | 210/499 |
| 2014/0023922 A1* | 1/2014 | Isshiki | H01G 11/22 |
| | | | 429/211 |
| 2014/0322587 A1* | 10/2014 | Lai | H01M 2/166 |
| | | | 429/145 |
| 2014/0370404 A1* | 12/2014 | Kato | H01M 8/0241 |
| | | | 429/418 |

FOREIGN PATENT DOCUMENTS

| | | |
|---|---|---|
| CN | 103178284 A | 6/2013 |
| CN | 103247770 A | 8/2013 |
| CN | 103824988 B | 5/2016 |
| CN | 103872370 B | 10/2017 |
| EP | 0959510 A2 | 11/1999 |
| JP | 1186824 | 3/1999 |
| JP | 2005276503 | 10/2005 |
| JP | 2010500717 | 1/2010 |
| JP | 2011089226 | 5/2011 |
| JP | 4903306 B2 | 3/2012 |
| JP | 2012227116 | 11/2012 |
| JP | 2014026877 | 2/2014 |
| WO | 2011160431 A1 | 12/2011 |

OTHER PUBLICATIONS

Machine translation of CN 103824988.*
Extended European Search Report in corresponding European Patent Application No. 15752688, dated Jul. 14, 2017, 9 pages.
Jianjun Zhang et al., "A Highly Safe and Inflame Retarding Aramid Lithium Ion Battery Separator by a Papermaking Process", Solid State Ionics, Jun. 20, 2013, pp. 49-55, vol. 245-246.
International Search Report and Written Opinion for PCT/US2015/016675, dated Jun. 18, 2015; ISA/KR.
First Office Action in corresponding Chinese Patent Application No. 20150018241.1, dated Sep. 27, 2018, 19 pages (with English-language translation).
Wang, et al. Confined Crystallization of PEO in Nanolayered Films Impacting Structure and Oxygen Permeability. Macromolecules 2009. 42:7055-7066.
2nd Office Action in corresponding Chinese Patent Application No. 201580018241.1, dated Aug. 13, 2019, 17 pages (including English translation).
Bhardwaj et al., "Electrospinning: A Fascinating Fiber Fabrication Technique", Biotechnology Advances, 2010, pp. 325-347, vol. 28.
Greiner et al., "Electrospinning: A Fascinating Method for the Preparation of Ultrathin Fibers", Angew. Chem. Int. Ed. 2007, 46, pp. 5670-5703.
Harry et al., "Detection of Subsurface Structures Underneath Dendrites Formed on Cycled Lithium Metal Electrodes", Nature Materials, Nov. 24, 2013, pp. 69-73, vol. 13.
Srinivasan et al., "Structure and Morphology of Small Diameter Electrospun Aramid Fibers", Polymer International 36, 1995, pp. 195-201.
Tung et al., "A Dendrite-Suppressing Composite Ion Conductor from Aramid Nanofibers", Nature Communications, Jan. 27, 2015, 7 pages.
Office Action in Japanese Patent Application No. 2016-553474, dated Apr. 2, 2019, 9 pages (including English-language translation).
Decision of Rejection in Japanese Patent Application No. 2016-553474, dated Mar. 12, 2020, 12 pages (including English-language translation).

* cited by examiner

DENDRITE-SUPPRESSING ION-CONDUCTORS FROM ARAMID NANOFIBERS WITHSTANDING EXTREME BATTERY CONDITIONS

CROSS REFERENCE TO RELATED APPLICATIONS

This application is a U.S. National Phase Application under 35 U.S.C. 371 of International Application No. PCT/US2015/016675 filed on Feb. 19, 2015 and published as WO 2015/127115 A1 on Aug. 27, 2015. This application claims priority to U.S. Provisional Application No. 61/941,785 filed on Feb. 19, 2014. The entire disclosures of all of the above applications are incorporated herein by reference.

GOVERNMENT SUPPORT

This invention was made with government support under DE-SC0000957 awarded by the Department of Energy, CBET1036672, CBET0932823, CBET0933384, ECS0601345 and EFRI0938019 awarded by the National Science Foundation. The Government has certain rights in the invention.

INTRODUCTION

The new generation of high-performance batteries requires ionic conductors that suppress growth of dendrites compromising battery safety. They also must withstand harsh thermal conditions at high currents. Finding a material satisfying a long list of mutually contradictory properties for such ion-conductors is difficult.

Increasing the energy capacity of batteries represents a bottleneck in the advancement of many technologies, as exemplified by electrical vehicles, solar/wind energy conversion, flexible electronics, and health monitoring devices. Much attention had been paid to maximizing the energy and power densities of the cathode and anode of lithium batteries,[1,2] especially using new forms of nanostructured materials[3,4] and thin polymer films[4]. Cathode-anode separators have attracted much less attention although they contribute to desired high capacity, high discharge rate, and lightweight electrical storage.

Typically, cathode-anode separators or ion-conducting membranes (ICMs) are made from microporous polymer sheets impregnated with solutions of lithium salts in alkyl-carbonates. These gel or liquid phases serve as the actual ion-conducting media in many ICMs from microporous polymer sheets. Shortcomings of such ICMs include flammability, fluid leakage, limited operating temperature range, and sporadic internal shorting of cathode and anode leading to battery fires. These shortcomings present acute safety challenges for batteries.

Materials adequately addressing the current problems are difficult to find because of the extensive list of requirements for ICMs that include high stiffness ($E_{ICM}$), shear modulus ($G_{ICM}$), and ion conductivity ($\Omega_{ICM}$). Moreover, as the charge rate and power density of the batteries increase, the importance of having adequate ICMs will inevitably increase. The list of requirements for ICM materials thus also becomes longer and increasingly more challenging to satisfy. Although many problems related to the stability of both cathode and anode materials still need to be resolved, the ICM-related challenges due to higher currents and current densities should be anticipated as well. Besides $E_{ICM}$, $G_{ICM}$, and $\Omega_{ICM}$, the new generation of batteries will need ICMs with improved high temperature resilience and reduced brittleness.

Many of the safety problems of modern batteries are related to dendrite growth and anode expansion in the charged state[5-9]. Piercing of porous polymer separators, for instance Celgard™ 2400 (FIG. 1A), by dendrites (FIG. 1B) is the most common mechanism of spontaneous battery failure which can also lead to short circuit and fire. The growth of dendrites is also the key roadblock for the development of batteries with lithium metal anodes, which can approach the theoretical limit for lithium-based storage devices with respect to capacity, power, and weight[10]. Many different approaches were previously proposed to prevent dendrite formation, including additives to the gel and liquid electrolyte[11] or composite gel electrolytes with inorganic fillers[12], however the dendrite problem still persists. The variety of data presented suggest that improvement of mechanical properties of ICM such as $E_{ICM}$[13] and/or $G_{ICM}$[14] could dramatically inhibit their growth. Although formation of metal deposits during battery charging/discharging cycles is a part of normal battery operation, sufficient compressive stress exerted on tips of growing dendrites is expected to inhibit/prevent their growth[14]. Reduced thickness of the ICM is also of importance in avoiding high internal resistance inside the battery cells that leads both to heating, instability of operation, and energy losses. The fundamental problem in this field is how to combine the high modulus, flexibility, and ion conductivity—properties that often appear to be mutually exclusive and essentially equates to finding new approaches to the materials engineering of ICMs. Similar difficulties also exist with several other combinations of mechanical and transport properties of materials[15]. Multiple material combinations and materials engineering approaches have been investigated in the past to make ICMs but each has presented their own unique limitations, eventually translating into alternative safety concerns and/or energy losses. Solid electrolytes based on Li-based ceramics represent one of the most advanced ion conductors at the moment[16-18]. They combine high mechanical stiffness with E values as high as 80-100 GPa and $\Omega_{ICM}$ values as high as $1.0 \times 10^{-3}$ S/cm[16,17] and $1.2 \times 10^{-2}$ S/cm[18]. These parameters make them exciting candidates for some high-power applications. However, their brittleness makes it difficult to incorporate Li-based ceramic materials into battery packs and necessitates thicker ICMs with increased internal resistance. Finding new dendrite-suppressing ion-conducting materials and de facto unite the advantages of ion-conducting glasses and polymers, is fundamentally important since dendrite growth is pervasive for virtually all electrochemical devices utilizing different metals and electrolytes.

SUMMARY

Favorable properties can be engineered in a composite made from aramid nanofibers (ANFs). Ion conducting membranes from ANFs can be prepared using layer-by-layer assembly, sol-gel processing, evaporation, spin coating, doctor blading, or other methods. As one of the components of the membrane ion conducting polymers, such as poly(ethylene oxide) (PEO) can be used. In various embodiments, the porosity of the membranes (15-20 nm) was designed to be smaller than the growth area of the dendrites (e.g. 25-100 nm). Composites exhibit high stiffness, ionic conductivity, and ion flux exceeding those found in other solid electrolytes. Successful suppression of hard copper dendrites by the ion conductors is demonstrated at extreme discharge conditions and in a functional battery with a lithium metal anode. Composites containing ANF also demonstrated exceptional temperature resilience and thus combined advantages of both ion-conducting glasses and polymers.

In an illustrative example, ANFs with a length of 1 μm and an average diameter of 5-10 nm (FIG. 1C) are made by dissolution of bulk Kevlar® fibers in DMSO in the presence of KOH. Notably, the ANFs are insulating, differentiating them from many other ultrastrong metallic and semiconducting nanomaterials (nanotubes, nanowires, etc.), which cannot be used as ICM materials.

As one embodiment of ANF-based ICMs, ANFs were combined with poly(ethyleneoxide) (PEO) serving as the solid ion-conducting media using the versatile layer-by-layer (LBL) assembly method[20]. In the past, composites made by LBL or other methods have shown exceptional mechanical performance[21] or ionic conductivity,[22,23] but not the combination of the two or any dendrite-suppressing capabilities.

DRAWINGS

The drawings described herein are for illustrated purposes only of selected embodiments and not all possible implementations, and are not intended to limit the scope of the present disclosure.

FIG. 3 demonstrates (A) Comparative evaluation of stiffness and internal resistance normalized to a standard CR2032 coin cell for (PEO/ANF)$_{200}$ and other ICMs. The corresponding references is given in the SI (PEGDMA=polyethylene glycol dimethacrylate, PEGDME=poly(ethylene glycol)dimethyl ethers, NBR=nitrile rubber, IL=ionic liquids, BPAEDA=bisphenol A ethoxylate diacrylate. PSt=polystyrene, PAN=polyacrylonitrile, SN=succinonitrile, PMMA=poly (methyl methacrylate)); (B) Hot solder iron test on (PEO/ANF)$_{200}$ and Celgard™ 2400 PE. (C) High temperature oven test on (PEO/ANF)$_{200}$ and Celgard™ 2400 PE. (D) Charge discharge curve for the 30th, 40th, and 50th cycle of a CR2032 button cell consisting of a LiCoO$_2$ cathode, (PEO/ANF)$_{200}$ with 300 μL 1M LiPF$_6$ in EC/DMC, and a lithium metal anode at C/4 charge/discharge rate. (E) DSC and (F) TGA curves for (PEO/ANF)$_{200}$, neat PEO, and Celgard™ 2400 PE.

FIG. 5 shows a photograph of (PEO/ANF)$_n$ LBL film on a glass slide used as the counter electrode for 2 seconds. This corresponds to approximately 0.02 Coulomb/cm$^2$ charge transferred. The sample was then rinsed gently with DMSO and dried under vacuum overnight at room temperature. The sample was then sputtered with gold in preparation for SEM. For cross-sectional images, the sample was broken in half to expose a cross section after cooling by liquid nitrogen.

DESCRIPTION

In one embodiment, a free standing film comprises alternating layers of aramid nanofibers (ANF) and polyalkylene oxide. In a non-limiting example, the polyalkylene oxide comprises polyethylene oxide (PEO). In various embodiments, the free standing film is characterized as having from 5 to 500 alternating layers of ANF and polyalkylene oxide. In one embodiment, the film has at least 10 alternating layers of ANF and PEO. For use in certain applications, the film is provided having a thickness of 3 microns or greater.

In another embodiment, an electrode assembly comprises a cathode, and anode, and an ion conducting membrane (ICM) disposed between the cathode and anode, wherein the ICM comprises aramid nanofibers and polyoxyalkylene oxide. For example, the ICM has the structure (PEO/ANF)$_n$, where n is from 5 to 500 and where PEO/ANF represents alternating layers of polyethylene oxide and aramid nanofiber. In various embodiments, at least one of the cathode and anode is a lithium metal electrode. A lithium electrochemical cell is provided that contains such an electrode assembly, and a lithium battery is provided that comprises a plurality of such cells.

In another embodiment, a free standing membrane contain aramid nanofibers fibers and has a porosity of 20-80% or 30-60%. The membrane can further contain nanoparticles. In various embodiments, the ratio of weight of the nanoparticles to the nanofibers is from 1:2 to 2:1 or from 1.2:1 to 1:1. In certain embodiments, the nanoparticles are selected from silica, alumina, zirconia, titania, magnesium oxide, and calcium oxide. The thickness of the membranes ranges from 1 micron to about 100 microns, in non-limiting examples. For battery applications it is desired to have a thickness of at least 3 or at least 5 microns, to provide sufficient strength and to avoid shorting from too thin a separator membrane.

In another embodiment, a method of making a nanofiber membrane involves exposing aramid fibers to base in an aprotic solvent to make a suspension of aramid nanofibers; depositing the suspension of nanofibers on a substrate; exposing the substrate to water, to remove the aprotic solvent and release the deposited suspension from the substrate; and drying the released suspension to form a free standing membrane.

Depositing is carried by layer-by-layer assemble, by spin coating, by spray coating, by doctor blading, or other suitable methods. A suitable aprotic solvent is dimethyl sulfoxide (DMSO).

Batteries such as lithium ion batteries, thin film flexible batteries, and redox flow batteries incorporate such membranes as separators or ion conducting membranes.

Batteries

In various embodiments, a thin film battery is provided. The battery contains ion-conducting media, wherein the ion conducting media is made by the methods described herein and comprises aramid nanofibers.) In other embodiments, a similar 18650 type of battery, comprising ion-conducting media based on aramid nanofibers.

One use of the free standing film is as an ion conducting membrane (or, equivalently, ion conducting medium, both abbreviated as ICM) in a battery such a lithium battery. In this application, the ICM can be disposed in an electrode assembly between a cathode and an anode. The electrode assembly is used in conventional fashion to make an electrochemical cell, and a battery (for example a lithium battery) can be made up of a plurality of electrochemical cells. The ICM's made of $(PAO/ANF)_n$ have the useful property of being resistant to puncture or rupture by dendrites formed during operation of the battery or cell.

The same ICMs can be utilized with other electrode materials represented by but not limited to Na, K, Zn, Mg, Ca, and Cu. Their performance is severely impeded by the dendrites while increase in charge-discharge rates is much needed for large scale energy storage exemplified but not limited to wind/solar farms. The ANF-based ICMs will be LBL deposited, spin-coated, rolled, sprayed, pressed with free-standing ANF-based sheets or otherwise deposited on these electrodes and integrated with other battery components.

In a redox flow battery (RFB), electroactive species are dissolved in separate liquid electrolytes called the catholyte (cathode) and the anolyte (anode). These liquids are separated by an ion-conducting membrane (ICM) made according to the current teachings. The liquids are stored in separate reservoirs and pumped past electrodes to charge and discharge the cell. Energy is stored and released when the electroactive species are reversibly oxidized and reduced at the electrode surface. Ions from the support electrolytes, such as $TBA^+$ or $BF_4^-$, are allowed to travel through the ICM to balance the charge difference created by the redox reactions. The standard potential between the cathodic and anodic reaction, along with the concentration and number of electrons transferred dictates the amount of energy stored. Energy and power are decoupled in this case as power scales with the surface area of the carbon electrodes and energy scales with the active species concentration.

In another embodiment, a method of making a free standing film comprises layer by layer (LBL) assembly of alternating layers of ANF and polyalkylene oxide.

Aramid Nanofibers

In one aspect, aramid nanofibers are provided that have a diameter of about 1 micron or less, 500 nm or less, or 300 nm or less. In certain embodiments the nanofibers are characterized by a diameter of 3 to 100 nm. In various embodiments, the diameter of the nanofibers is on the order of 3 to 30 nm. In various embodiments, the nanofibers have a high aspect ratio, in that the length of the nanofibers is at least five times, at least ten times, or at least 20 times their diameter. In various embodiments, the nanofibers have lengths of 0.1 to 10 micrometers, for example 1 to 10 micrometers or 5 to 10 micrometers.

In one embodiment, the nanofibers are prepared as suspensions in a suitable solvent such as DMSO. Suspensions contain aramid nanofibers and an aprotic solvent such as DMSO. The suspension optionally further contains water. If water is present in the suspension, it is present in a volume ratio of water to aprotic solvent in a range of $1/1,000$ to $1/20$, in non-limiting example.

A process for making a suspension of aramid nanofibers in a solvent is found for example in Arruda et al., United States application US 2013-0288050 published Oct. 31, 2013, the entirety of which is hereby incorporated by reference. An aprotic solvent such as DMSO has been found to be suitable for the synthetic method. As a first step, a conventional aramid fiber (of micro or macro dimensions) is subjected to an optional first step involving exposing the aramid material to ultrasound energy while the aramid material of macro dimensions is in contact with a solvent. N-methylpyrrolidone (NMP) has been found to be a suitable solvent. The aramid material undergoing exposure to the ultrasound energy is made of fibers having a diameter of greater than 1 micrometers, in non-limiting example.

After pretreatment of the aramid material with ultrasound, the aramid material is removed from the solvent and combined with a solution containing a base and an aprotic solvent. If no ultrasound treatment is applied, aramid fiber is combined directly with the solution containing base and an aprotic solvent. In certain embodiments, the base is KOH and the aprotic solvent is DMSO. Thereafter, the aramid material is reacted in the KOH/DMSO solution, in exemplary fashion at a temperature below 50° C. for times sufficient to produce aramid nanofibers having a diameter 3 to 100 nanometers, 3 to 50 nanometers, or the like. The nanofibers are produced in situ and are suspended in the solution. It is found that under these conditions, the aramid material does not proceed to molecular dimensions where it could be considered as having been dissolved in the solvent. Rather, discrete nanofibers can be visualized in the suspension and in films produced from the suspension, which in various embodiments show the nanofibers having diameters less than 100 nm and high aspect ratios as described. The reaction in solution to prepare the suspension is carried out preferably at low temperatures and can be carried out at room temperature or about 20° to 30°, for example, 25° C.

In various embodiments, the KOH/DMSO solution can contain water in a volume ratio of water to DMSO of 1 to 20 to 1 to 1,000. In a non-limiting embodiment, the reacting solution contains equal parts by weight aramid material and KOH. Further, the aramid material and the base are present in relatively minor amounts in the solution, making up for example about 0.05 percent to about 5 percent by weight of the solution. In one embodiment, the weight of the KOH and the aramid material is about 7.6 percent by weight of the suspension. In other non-limiting embodiments, suspensions are made that contain 2% by weight (a 2% suspension) or that contain 1% by weight (a 1% suspension) nanofibers in the aprotic solvent.

Aramid Material

The aramid material described herein is made of aramid polymers, generally in the form of fibers, threads, or yarns. Aramid fibers of micro or macro dimensions are commercially available. Typically a commercially available aramid fiber is characterized by a diameter in the micro range, for instance by a diameter of one micron or greater. In one aspect, the current disclosure provides methods for transforming the commercially available microsized aramid fibers into aramid nanofibers.

Aramid polymers are defined as those that contain aromatic groups and amide linkages in the backbone. Normally, the amide groups provide linkages between adjacent aromatic groups. In one aspect, an aramid polymer is characterized as one in which at least 85% of the amide groups in the backbone are directly attached to two aromatic groups, especially where the aromatic groups are phenyl groups.

Two popular aramids are para-aramid fiber and meta-aramid fiber. The former is well known under the trademark of Kevlar® and others. Its backbone consists of phenyl groups separated by amide linkages, wherein the amides link the phenyl groups in a para configuration. A para-aramid represented by Kevlar® is also called a poly (para-phenylene terephthalamide) (PPTA). Although the synthesis is not limited to reacting the particular monomers, in a simple form, a PPTA can be understood as the reaction product of para-phenylene diamine and terephthaloyl dichloride. In similar fashion, a meta-aramid such as illustrated by Nomex® material can be understood as the product as para-phenylene diamine and isophthaloyl dichloride.

Besides meta-aramids like Nomex® and para-aramids like Kevlar®, other aramid fibers are available of the copolyamide type. Copolyamides have structures that result from polymerizing other aromatic diamines with terephthaloyl or isophthaloyl chlorides, alternatively in the presence of para-phenylene diamine. In whichever way the aramid fibers are produced, it is believed that the useful physical properties of the fibers derive from the stiff nature of the polymers and orientation along the fiber direction of the aromatic chains.

The aramid material can also be obtained from used bullet proof vests, tents, ropes, or other items containing Kevlar/aramid macroscale fibers, or from waste or scrap from the manufacture of the aramid materials. The source materials will be cleaned and dissolved in DMSO following the protocol being used for the pristine aramid fibers. In this way a method of recycling aramid materials is provided. Impurities can be washed out with organic solvents if desired after the nanofiber suspension is produced.

Nanofibers

Aramid nanofibers are defined by their composition and by their dimensions. Aramid nanofibers are made of aramid material such as discussed above. By nanofibers is meant that the diameter is in the nanometer range, and especially in the range of 3 to 100 nanometers, 3 to 50 nanometers, 4 to 40 nanometers, 3 to 30 nanometers, and 3 to 20 nanometers. In addition to diameters in the nanometer range, the aramid nanofibers are characterized by a high aspect ratio, meaning that the length of the fibers is at least 5 times, at least 10 times, or at least 20 times the diameter. In various embodiments, the length of the aramid nanofibers is greater than 0.1 microns or greater than 1 micron. Non-limiting examples of the length of the aramid nanofibers includes 0.1 to 10 microns and 1 micron to 10 microns.

Making Suspensions of Aramid Nanofibers

A process begins with commercially available aramid fibers having macro dimensions. Suitable aramid materials include those represented by the Kevlar® and Nomex® trade names and by aromatic copolyamide materials.

In a preferred first step, an aramid fiber is treated with ultrasound in a solvent to swell the fiber as a preliminary step in the manufacture of a nanofiber. Examples of ultrasound treatment are given in the examples below. It has been found suitable to sonicate the starting material aramid fiber in a solvent such as NMP to swell the fiber before further reaction. After the ultrasound treatment, the swollen fiber is removed from the NMP solvent and combined in another solvent in the presence of a base. The fiber is then reacted with the base and the solvent at low to ambient temperatures for a time until nanofibers are formed. Advantageously, the temperature of reaction is at 50° or less, at 40° or less, or at 30° or less. In various embodiments, the temperature of reaction is 20 to 50° C., 20 to 40° C. or 20 to 30° C. Reaction can be carried out at or about 20° C. or at or about 25° C. Reaction at 25° C. is considered to be at room temperature.

In a preferred embodiment, the solvent used to prepare the nanofibers is dimethyl sulfoxide (DMSO) and the base is potassium hydroxide (KOH). Preferably, the base is provided in stoichiometric excess to the aramid material, and is conveniently applied in a one-to-one weight ratio. Relative to the amount of solvent, the combined weight of the base and the aramid material is from about 0.05 to 5%. In an exemplary embodiment, 500 mL of solvent is used, in which 1.5 grams of KOH are dissolved and in which 1.5 grams of aramid fiber material is suspended.

As detailed below, the reaction conditions are sufficient to transform the macro-dimensioned aramid starting material into aramid nanofibers having dimensions as discussed above and further exemplified below. The reaction conditions do not lead completely to dissolution of the aramid material. As a result, the reaction product is a suspension of nanosized aramid nanofibers in a solvent system that preferably contains a DMSO.

In addition to DMSO, the solvent system can contain small amounts of water, for example wherein the volume ratio of water to the solvent (i.e. an aprotic solvent such as DMSO) is from $\frac{1}{20}$ to about $\frac{1}{1,000}$. In various embodiments, it has been observed that the presence of water leads to production of nanofibers having a smaller diameter. In this way, the diameter of the nanofibers produced by the method can be controlled to a desirable extent.

Polyalkylene Oxide

In various embodiments, alternating layers of polyalkylene oxide are used with layers of aramid nanofibers to make free standing films. Examples include polymers and copolymers of predominantly low C2-C4 alkylene oxides such as ethylene oxide, propylene oxide, and butylene oxide. Water soluble polyalkylene oxides are preferred. A preferred material used in the Examples is polyethylene oxide. Commercially available PEO can be used having a nominal molecular weight or about 200 to about 10,000. Examples include those known under the generic names of PEG 200, PEG 400, PEG 800, PEG 1000, PEG, 2000, PEG 4000, PEG 10,000, and the like. Aqueous solutions of PAO are used to build up the ANF ICMs of the present disclosure.

LBL Assembly and Hydrogel Spin Coating

In one embodiment, free standing films are built up by depositing alternating layers of ANF and PAO on a substrate, then after construction removing the film from the substrate. The process is readily automated, and can also be carried out manually.

One way involves layer by layer assembly. For the $(PAO/ANF)_n$ films, a first layer of PAO is applied by exposing the substrate (such as a glass slide) to a solution of PAO for a few seconds or a few minutes, removing the slide from the solution, and rinsing. Thereafter the slide containing one layer of PAO is exposed to a solution or suspension of aramid nanofibers, again for a brief time encompassing a few seconds up to a few minutes, followed by rinsing. In this way a bilayer PAO/ANF is laid down, and the process is then repeated or reiterated n times to build up $(PAO/ANF)_n$. As noted, n is preferably at least 5, at least 10, at least 20, at least 50, or at least 100. In various embodiments, the maximum number of layers is 50, 100, 200, 300, 500, or 1000.

In another embodiment, hydrogels containing ANFs are built up on a slide to provide free standing films useful as ICMs. The ICM in this embodiment is a free standing film comprising multiple layers of ANF hydrogels. In a non-limiting example, 1% Aramid fiber dispersion is dropped onto a glass slide. The glass slide is then spun at 1000 rpm to form a uniform film on top of the glass slide. Deionized water is then gently poured over the ANF film to form the ANF hydrogel. Polymer solutions, such as the polyalkylene oxide and polyethylene oxide described herein, can be used in place of DI water to form an ANF/polymer composite hydrogel. The glass slide is spun again at 1000 rpm to remove excess water/polymer solution. The ANF hydrogel coated glass slide is then dried in a 70° C. vacuum oven for 30 minutes. The process is repeated until a desired thickness is reached. For a typical 3 μm ANF film, this process is repeated 10 times. The ANF film is then detached from the glass slide using a 0.1% hydrogen fluoride solution. The ANF is washed with DI water and ethanol repeatedly to remove excess HF and subsequently dried in a 70° C. oven.

Depositing the Suspension on the Substrate

In addition to the layer by layer technique, suitable thicknesses of membrane can be built up faster using other coating techniques such as doctor blading, spin coating, spray coating, and the like. The membrane can be built up in multiple or repeated applications of these techniques, or in a single application, depending on the requirements. For example, a layer by layer process can be "assisted" by spin coating, whereby a plurality of layers are added on top of one another to build up a thick membrane. The thickness is built up in this way much faster than with the conventional LBL technique. Thus 5 to 20, 30, 40, or 50 layers can be deposited to build up a thick membrane.

Depending on the intended application, the suspension of nanofibers can be deposited on the substrate using doctor blading. Another alternative is spray coating. All of these techniques for putting a composition on a substrate are known and can be adapted.

Removing the Deposited Suspension from the Substrate

Once the suspension has been deposited onto the substrate and built up to a suitable thickness, it can be released by treating it with water. The film undergoes a water/DMSO solvent exchange process and releases from the substrate. After further drying and optional pressing, the membrane is ready for use. For example, the released membrane is dried between sheets of Teflon under compression and under vacuum at a temperature sufficient to remove residual water and other solvent.

Formulating Additives into the Nanofiber Suspensions

Before the suspensions are deposited onto the substrate, additives can be incorporated to provide additional benefits. For example, powder additives can be included in the dispersion before the depositing process by means of a suitable mixer (for example a speed mixer, a flacktek mixer, or a planetary mixer). The dispersion is measured out into a mixer container in addition to the additive powder. Grinding media such as zirconia beads can be added to ensure a smooth mixture. The dispersion is then mixed until a homogenous solution is achieved. The container is then placed under vacuum to remove any air bubbles trapped in the viscous dispersion. The dispersion is now ready to be deposited onto the substrate.

One class of additives comprises the inorganic or ceramic nanoparticles. These are characterized by nanosizes on the order of less than a micron; they contribute strength, porosity, and other advantages to the membranes. It is preferred to use nanoparticles with a size less than one micron, for example, from 5 nm to 1000 nm, so as to be able to incorporate the particles into suitably thin membranes. Non-limiting examples include nanopowders of silica, alumina, titania, zirconia, magnesium oxide, and calcium oxide. Other suitable powders are nanosized zeolites and ceramic electrolytes such as lithium phosphorus oxy nitride (LI-PON). Such materials are commercially available.

Other additives include polyelectrolytes that are incorporated into the membrane, for example to provide for ion conduction, either of cations or of anions. Non-limiting examples include polycations such as poly(diallyammonium chloride (PDDA) and polystyrene sulfonate (PSS).

Another class of additives is materials, usually organic, that sublime at low temperatures, such as 100° C. or less under reduced pressure. These are added to the suspensions and lead to porosity in the membrane when the dried membrane containing the material is subjected to sublimation conditions. A useful material is naphthalene, which sublimes under reduced pressure.

Other additives include polyethylene oxide and related polyalkylene oxides, which can serve to enhance solid state lithium conduction.

The additives are incorporated at levels suitable for obtaining the desired benefits. For the polyelectrolytes, about 15-20%, based on the content of nanofibers has been found suitable. For additives that lead to porosity (e.g. the nanopowders and the subliming material), the amount to be used is varied to achieve the right amount of porosity. Generally, the additives are incorporated at a rate of 10%-200% relative to the level of the nanofibers.

Porosity and Size of the Membranes

In various embodiments, the membranes are characterized by a porosity that makes them suitable for use in battery and other applications. The porosity of the membranes is controlled by the process used for making it, and the additives formulated into the suspensions, as discussed herein. In various embodiments the membranes have a porosity of 10-90%, of 20-80%, or of 30-70%. In other embodiments, the membranes have a porosity of at least 10% at 20%, at least 25%, at least 33%, at most 90%, at most 75%, at most 60%, at most 50%. Porosity can be determined by determining the volume of a membrane (area times the thickness) and comparing the mass of the membrane to the mass of a block of ANF. The porosity is the mass of the membrane divided by the mass of the block times 100. In this determination, the loss of mass in the membrane is attributed to the presence of pores. In other embodiments, the porosity is determined using the ASTM standard method for porosity D2873, which is a gas absorption method.

The aramid nanofibers form films and bulk composites with tightly interpenetrating network of the nanoscale fibers. The pore size in these networks can be less than 10 nm which is sufficient for ion transport. At the same time this size pore size is very restrictive for the growth of dendrites whose diameter and growth point exceed 50 nm in size. For dendrite suppression it is preferred to make membranes with pore sizes on the order of about 20 nm or less. For example, pore sizes of 5 nm or less can be achieved making ANF only membranes. The pore size is affected as well by the amount and particle size of additives such as the nanoparticles described herein. Nanoscale pores of the ANF networks suppress the growth of dendrites because the walls of the pores do exhibit mechanical pressure on the growing dendrite and alter conditions of metal deposition at the tip. Pore size is measured using mercury porosimetry. A nitrogen physisorption method such as a BET method can also be used to determine pore size and surface area.

In contrast, other nonwoven separators and ICMs such as those made from cellulose or even those made from aramid materials (Dreamweather) with pore size larger than the dimensions of the dendrites will not be able to restrict dendrite growth as well as ANF nanoporous networks.

For use in batteries, a minimum thickness of about 5 microns is preferred because of the desire to make a strong membrane that will not short. As a rule, a membrane is made of a thickness that will give it the tear strength needed for the application, but no thicker so as not to waste material. The thickness of the membrane is controlled by how thick a layer of the ANF suspension gets deposited on the substrate during manufacture. This in turn depends on the setting of the doctor blade, or how many individual layers are deposited, for example by LBL or by spin coating assisted LBL.

Figure 1:
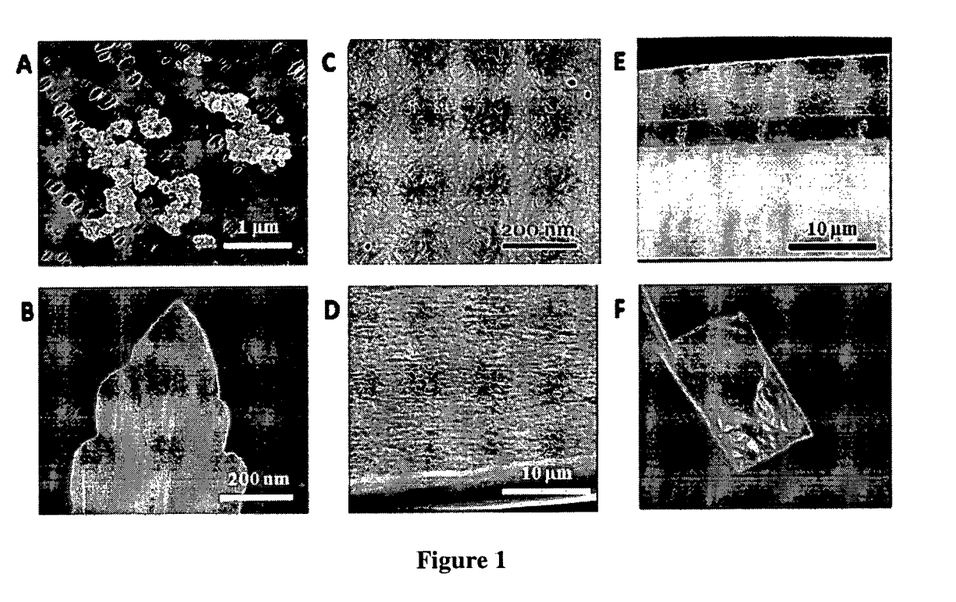
FIG. 1 illustrates (A) top view SEM images of copper dendrite penetrating through Celgard™ ICM. (B) SEM image of the tip of a copper dendrite. (C) TEM image of ANF. (D) Top and (E) side view SEM images of (PEO/ANF)$_{200}$. (F) optical photograph of (PEO/ANF)$_{200}$.
Figure 4:
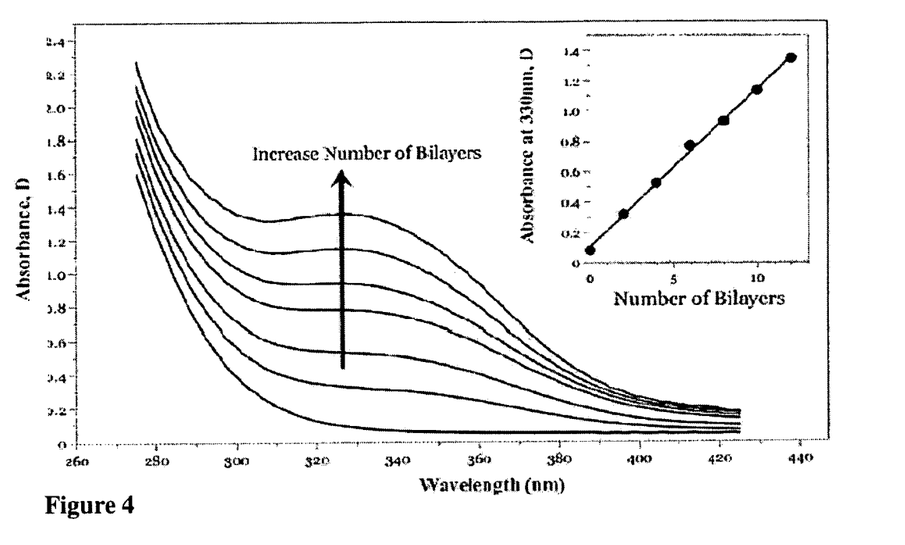
FIG. 4 illustrates the UV-Visible spectra of (PEO/ANF)n LBL composite deposited on glass slide with different number of bilayers. Absorbance at 330 nm shows linear growth of the film (inset).
Figure 7:
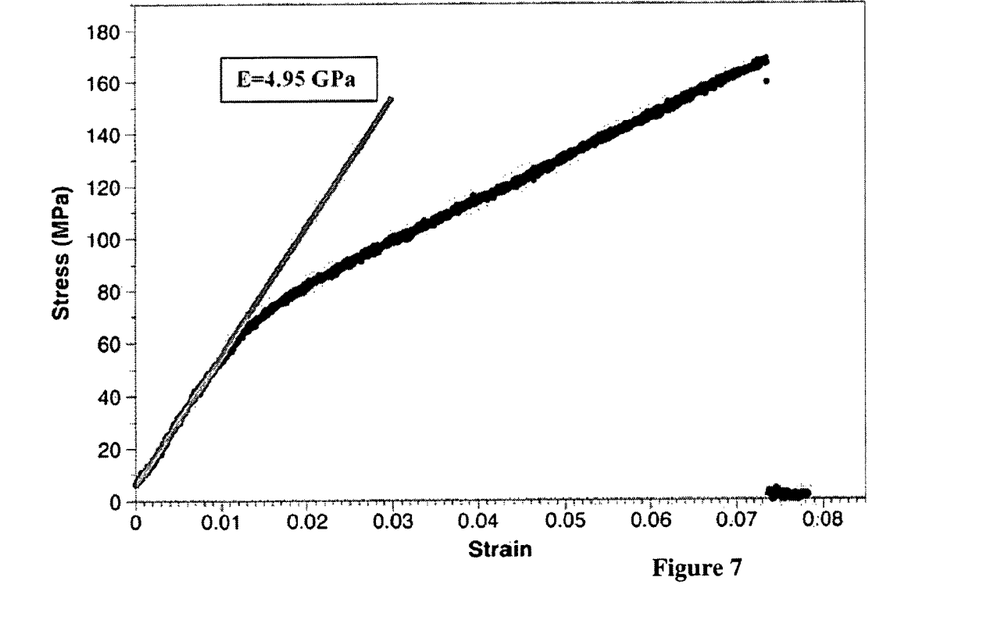
FIG. 7 illustrates the stress-strain curve of (PEO/ANF)$_{100}$; ultimate strength is $\sigma_{ICM}$=169 MPa. The initial linear region yields a Young's Modulus of E=4.95 GPa.
Figure 8:
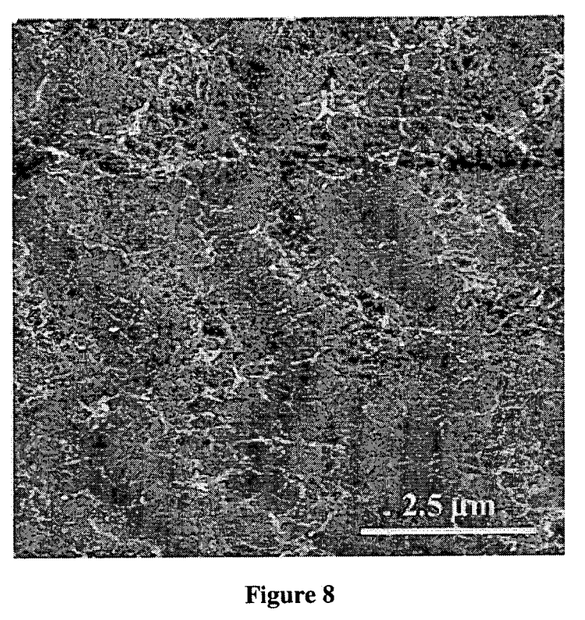
FIG. 8 illustrates an AFM image of a PEO-ANF interconnected network.

Further non-limiting aspects of the invention are now described. The linear growth of the $(PEO/ANF)_n$ film was indicated via UV-vis spectroscopy by the steady increase in the absorbance at 330 nm as the number of LBL deposition cycles, n, increases. (FIG. 4). Free-standing LBL multilayers were obtained by chemical delamination of $(PEO/ANF)_n$ films (SI) after the deposition of 10-200 bilayers. Their smoothness, transparency, and strong interference colors indicated their uniform thickness and structural homogeneity, which can be also seen in SEM and optical images (FIG. 1D-F). AFM images of $(PEO/ANF)_5$ display a dense and uniform interconnecting network of thin nanoscale fibers (SI, FIG. 8). Such morphology provides structural prerequisites for high ion conductance, stiffness, and efficient distribution of external stresses. The ultimate tensile strength, Young's modulus, and shear modulus were $\sigma_{ICM}=170\pm5$ MPa, $E_{ICM}=5.0\pm0.05$ GPa and $G_{ICM}=1.8\pm0.06$ GPa, respectively (FIG. 7). Given PEO's value of $E_{ICM}=100$ MPa, $(PEO/ANF)_{200}$ nanocomposites show a ca. 500-fold increase in the elastic modulus. Their impregnation with lithium triflate (often used in Li batteries) did not change the mechanical nature of the $(PEO/ANF)_{200}$ nanocomposite.

Figure 3:
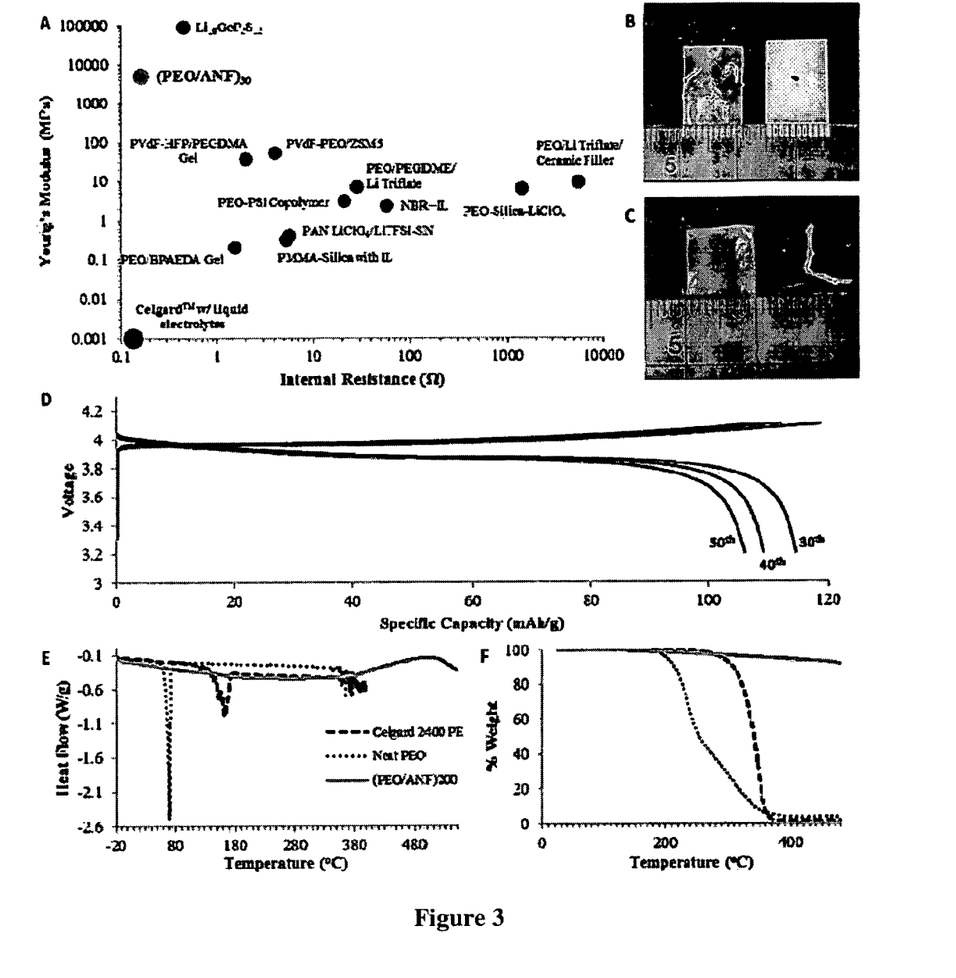
Figure 9:
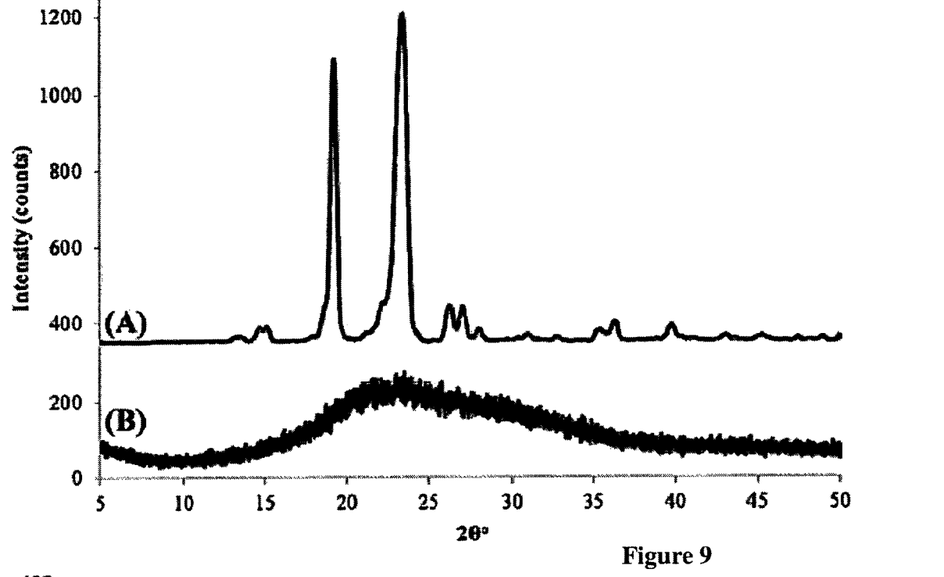
FIG. 9 illustrates a XRD pattern of (A) neat PEO and (B) (PEO/ANF)200.

Crystallization of PEO is known to dramatically decrease ionic conductivity of ICMs made by traditional casting or blending[24]. However, in the $(PEO/ANF)_n$ composite we do not observe crystalline phase even though the polymer is deposited at room temperature, under which conditions PEO crystallization should spontaneously occur for thermodynamic reasons, suggesting that LBL deposition effectively prevents PEO crystallization. This fact can be confirmed by X-ray diffraction (XRD) (FIG. 9) wherein the material displays a diffuse broad band for 2θ between 20° and 30° instead of sharp peaks at 2θ=19° and 2θ=23° observed in crystalline PEO (FIG. 9). Differential scanning calorimetry data (DSC) also support this conclusion (FIG. 3E). Neat PEO shows a sharp endothermic peak around 70° C., which corresponds to melting of the crystalline polymer, which is completely absent in the DSC curve for $(PEO/ANF)n$ (FIG. 3E). In FT-IR spectra of the nanocomposites, we observed a strong peak at 2860 cm$^{-1}$ (FIG. 10) assigned to intermolecular hydrogen bonds between PEO and ANF. The prevention of PEO crystallization and the efficient LBL assembly is credited to these bonds[25].

In order to investigate ionic conductivity, free-standing $(PEO/ANF)_n$ membranes were sandwiched between two lithium metal electrodes and housed in a CR2032 coin battery cell. Without any additives or additional treatments, the ionic conductivities of $(PEO/ANF)_{200}$ at 25° C. and 90° C. were $\Omega_{ICM,25°C.}=5.0\times10^{-6}$ S/cm and $\Omega_{ICM,90°C.}=2.6\times10^{-5}$ S/cm, respectively. The $(PEO/ANF)_{200}$ membrane was immersed in a 1M lithium triflate solution in a propylene carbonate (PC)/dimethyl carbonate (DMC) 1:1 v/v mixture, followed by overnight drying in a vacuum oven, resulting in a solid material. The ionic conductivity of $(PEO/ANF)_{200}$ after that was $5.5\times10^{-5}$ S/cm, which is comparable with some Li sulfide glasses[16,17]. To better replicate the actual battery conditions and mitigate contact resistance between the electrode and the solid $(PEO/ANF)_{200}$ membranes, 150 Ml of a 1M lithium hexafluorophosphate solution in a ethylene carbonate (EC)/dimethyl carbonate (DMC) 1:1 v/v mixture was added to each side of the membrane. The ionic conductivity of $(PEO/ANF)_{200}$ reached values as high as $\Omega_{ICM,25°C.}=1.7\times10^{-4}$ S/cm.

Batteries

One use of the free standing film is as an ion conducting membrane (ICM) in a battery such a lithium battery. In this application, the ICM can be disposed in an electrode assembly between a cathode and an anode. The electrode assembly is used in conventional fashion to make an electrochemical cell, and a battery (for example a lithium battery) can be made up of a plurality of electrochemical cells. The ICM's made of $(PAO/ANF)_n$ have the useful property of being resistant to puncture or rupture by dendrites formed during operation of the battery or cell.

With respect to dendrite propagation, we have to point out that investigation of lithium dendrite growth and suppression is practically complicated due to the high reactivity of lithium metal with ambient air and water. Fast oxidation of Li metal changes the shape, length, and mechanical properties of the dendrites, making the results inconclusive. Therefore we decided to carry out an analogous study for copper dendrites, which can serve as a convenient experimental model under ambient conditions. The results obtained for copper do remain relevant for lithium as the Young's modulus of copper is E=129.8 GPa, while that of lithium is E=4.91 GPa. If an ICM can stop copper dendrites from propagating, it will also suppress the much softer lithium dendrites. In addition, note that copper ion-based batteries are also being considered, and the insights gained into the engineering of materials with a combination of desirable mechanical properties and high ionic flux are also applicable to them (26).

To design successful dendrite-suppressing ICMs we need to consider the dimensions of dendrites and of ion-conducting pores. The growth zones of dendrites, $d_{dendr}$, are 50-100 nm in size (FIGS. 2E & I). The dendrites propagate through ICMs via the path of the least mechanical resistance. Importantly, typical polymeric ICMs are made as heterogeneous membranes to provide high ionic conductivities. Therefore, if a heterogeneous material has soft pores larger than $d_{dendr}$, the parts with low modulus determine the propagation of dendrites rather than the stiffer parts. If the heterogeneity of an ICM is smaller than $d_{dendr}$, the growth zone of the dendrite experiences a resistance equal to the averaged modulus of the membrane.

Many ICMs are strongly heterogeneous at scales much greater than $d_{dendr}$. Celgard™, for instance, is microscopically stiff with an E value of 1.1 Gpa and a tensile strength of 11.1 Mpa, but it has large pores of ion-conducting gel with sizes of ca. 430 nm (FIG. 1A). Consequently, the mechanical properties relevant to dendrite growth are those found in the propylene carbonate and ethylene carbonate loaded with lithium salts[11]. Being liquids, the electrolytes offer little to-no resistance with regard to blocking dendrite growth. The scale of inhomogeneity and dendrite inhibition in $(PEO/ANF)_n$ is very different. $(PEO/ANF)_n$ exists as a film of tightly interconnected PEO and ANF networks. Pores in the film are ca. 20 nm in diameter (FIG. 1C,D). In comparison, we observed that copper dendrites have growth zones with sizes of 50-100 nm and tip diameters of 25 nm (FIG. 1B). The growth of dendrites will experience the component-averaged (macroscopic) stiffness of $(PEO/ANF)_n$ since its pores are smaller than the dendrite tips.

Figure 2:
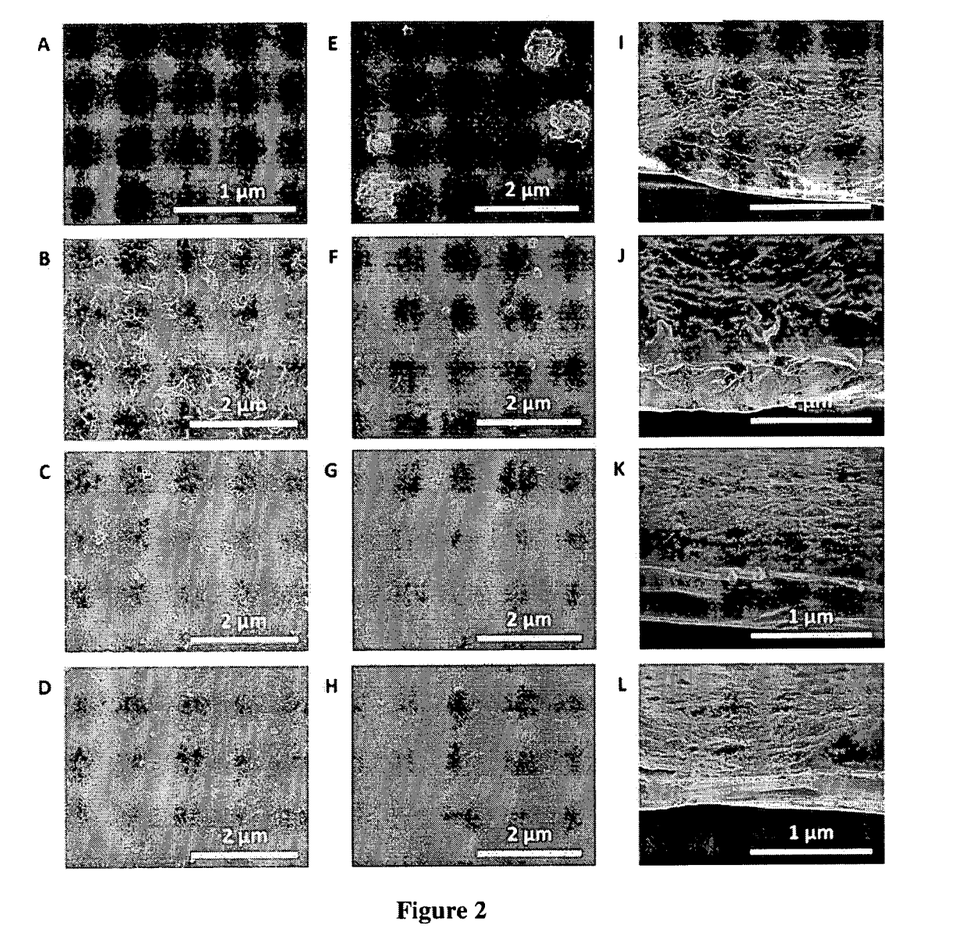
FIG. 2 illustrates SEM images of copper electrode with (A) no coating; (B) (PEO/ANF)$_{10}$; (C) (PEO/ANF)$_{30}$; (D) (PEO/ANF)$_{50}$. Copper dendrite growth with current density of 10.3 mA/cm$^2$ on (E) bare copper electrode; (F) copper electrode coated with (PEO/ANF)$_{10}$; (G) (PEO/ANF)$_{30}$; and (H) (PEO/ANF)$_{50}$. (I), (J), (K), (L) are cross sections of (E), (F), (G), (H) respectively. Total charge transferred=0.02 C/cm$^2$.

Investigation of dendrite growth was carried out under harsh conditions of high current density (10.3 mA/cm$^2$). This rate is equivalent to 6-7 C extreme charge/discharge rate, at which one could fully charge a battery in less than 10 minutes, while the typical charging rate for batteries is ca. 0.25 C. Copper electrodes with and without (PEO/ANF)$_{10}$, (PEO/ANF)$_{30}$, and (PEO/ANF)$_{50}$ coatings were investigated by SEM (FIG. 2) after a constant total charge Q=0.006 mAh/cm$^2$ was transferred. Hemispherical copper dendrites on average 500 nm in diameter were formed on the bare Cu electrode (FIG. 2A, E, I). The dendrites were no longer visible on electrodes coated with as few as 10 bilayers, i.e. (PEO/ANF)$_{10}$ (FIG. 2B, F, J), corresponding to a film thickness of 162 nm. However, cracks from dendrite growth are observed (FIG. 2J) and indicate dendrite formation underneath the (PEO/ANF)$_{10}$ film. Dendrites were completely suppressed for the electrode carrying (PEO/ANF)$_{30}$ (FIG. 2C, G, K), corresponding to a film thickness of 486 nm. In this case dendrites could no longer penetrate through or break the film. The dendrites were reduced to an evenly deposited layer at the interface underneath the film, which is exactly the behavior necessary for a successful battery. Deposition of (PEO/ANF)$_{50}$ films with a thickness of 809 nm results in further suppression of dendrite formation (FIG. 2D,H, L). We believe that (PEO/ANF)$_n$ films suppress the growth of dendritic deposits by exerting a compressive force on them while being able to sustain the ionic flux through the membrane in accord with a previously elaborated theoretical mechanism[14].

FIG. 3A summarizes the mechanical and electrochemical properties of current ICMs and (PEO/ANF)$_n$. Popular separators such as Celgard™ monolayer PP, PE, and trilayer PP/PE/PP have thicknesses ranging from 12 to 40 μm, and when infused with electrolyte give an internal resistance of R$_I$=0.25 Ohm. However, the large pores providing the conductive pathways also allow for the uninhibited growth of dendrites because of the softness of the containing gel. Solid electrolytes, such as polymers incorporating inorganic or organic fillers, generally exhibit higher ionic conductivity than their pure polymer forms. These membranes are cast with a thickness of 100-400 μm, which in return can introduce internal resistance as high as 2000 Ohm. The consummate mechanical properties and ionic conductivity of (PEO/ANF)$_n$ makes possible a substantial reduction of thickness of ICMs based on their ability to significantly decrease internal resistance by 2 to 3 orders of magnitude without sacrificing mechanical properties or dendrite suppression. A 486 nm (PEO/ANF)$_n$ ICM introduces 0.16 Ohm of resistance into the CR2032 battery cell and still exhibits higher mechanical strength than any polymer-based electrolyte and separator, being even competitive with Li-based ceramics. To substantiate the practicality of (PEO/ANF)$_{30}$ ICMs and their chemical stability in contact with lithium metal, we assembled a battery cell using (PEO/ANF)$_{200}$, a lithium metal anode, and a LiCoO$_2$ cathode. The cell was studied over 50 cycles at C/4 (39 Ma/g. FIG. 3D). The battery exhibited a discharge capacity of over 100 mAh/g and an excellent discharge efficiency of 98%. Although the battery parameters are limited by the stability of LiCoO$_2$ cathode and the charge transfer kinetics at both cathode and anode, which complicate evaluation at extreme charge rates, this test demonstrates that a film as thin as 3 μm can perform at least as well as 25 μm thick layer of Celgard™ and prevent rapid deterioration of the battery due to lithium metal dendrite growth. Further studies were conducted to comparatively investigate the thermal stability of (PEO/ANF)$_n$ nanocomposites which is needed when battery operates under elevated temperatures, high charge density, high discharge rate conditions.[27,28] or with malfunctioning thermal management system. In the hot solder iron test accepted in industry as a standard, a 180° C. solder iron tip was placed on both a PEO-ANF film and a Celgard 2400 PE separator for 30 seconds. The Celgard™ 2400 PE was burned and a hole formed in it. The PEO-ANF film showed no damage (FIG. 3B), which can be attributed to the high temperature stability of Kevlar® translating also into ANFs. In the high-temperature oven test, both PEO-ANF and Celgard™ 2400 PE were kept at 200° C. for 10 minutes. Celgard™ PE melted completely. PEO-ANF remained flat, intact, and un-deformed (FIG. 3C), indicating that high-temperature shrinkage and deformation are minimal for (PEO/ANF)$_n$ ICMs. Thermal stability tests of the PEO-ANF nanocomposite investigated by DSC and TGA (FIGS. 3E & F) demonstrated stability exceeding 400° C., which is exceptional among polymeric ICMs and is comparable to Li-based ceramics (17).

In conclusion, PEO and ANFs can be assembled into ICMs in which amorphous PEO produces ion-conducting channels smaller than d$_{dendr}$. (PEO/ANF)$_{30-200}$ films display ionic conductivity as high as 1.7×10$^{-4}$ S/cm and are capable of complete suppression of hard copper dendrites at a thickness of less than 500 nm even when operating under extreme charge/discharge rate conditions. Resilience to harsh electrochemical and thermal conditions, high flexibility and high ionic flux accompany these properties, a combination that has been thus far difficult to achieve in other classes of ion-conducting materials, while being essential for high energy density, high charge/discharge rate batteries.

REFERENCES

B. Scrosati, J. Garche. Lithium batteries: Status, prospects and future, J. Power Sources 195, 2419-2430 (2010).

D. S. Su, R. Schlögl, Nanostructured Carbon and Carbon Nanocomposites for Electrochemical Energy Storage Applications, ChemSusChem 3, 136-168 (2010).

Z. Milicev, R. Burtovyy, I. Luzinov, G. Yushin, A major constituent of brown algae for use in high-capacity Li-ion batteries, Science 334, 75-79 (2011).

F. Cebeci, D. Schmidt, S. Yang, P. Hammond, Layer-by-layer assembled polyaniline nanofiber/multiwall carbon nanotube thin film electrodes for high-power and high-energy storage applications, ACS Nano 5, 8552-8561 (2011).

C. Chan, H. Peng. G. Liu. K. McIlwrath, X. Zhang. R. Huggins, Y. Cui, High-performance lithium battery anodes using silicon nanowires, Nature Nanotech. 3, 31-35 (2007).

P. G. Bruce, S. A. Freunberger, L. J. Hardwick, J. Tarascon, Li—O2 and Li—S batteries with high energy storage, Nature Mater. 11, 19-29 (2012).

J. Tarascon, M. Armand, Issues and challenges facing rechargeable lithium batteries, Nature 414, 359-367 (2001).

J. Goodenough, Y. Kim, Challenges for Rechargeable Li Batteries, Chem. Mater. 22, 587-603 (2009).

J. Vetter, P. Novak, M. Wagner, C. Veit, K. Möller, Ageing mechanisms in lithium-ion batteries, J. Power Sources 147, 269-281 (2005).

M. Armand, J. Tarascon. Building better batteries, Nature 451, 652-657 (2008).

K. Xu, Nonaqueous liquid electrolytes for lithium-based rechargeable batteries, Chemical Reviews, 4303-4417 (2004).

S. Kim. K. Choi, S. Cho. E. Kil. S. Lee. Mechanically compliant and lithium dendrite growth-suppressing composite polymer electrolytes for flexible lithium-ion batteries, J. Mat. Chem. A 1, 4949 (2013).

J. Yamaki, S. Tobishima, K. Hayashi, K. Saito, Y. Nemoto, M. Arakawa, A consideration of the morphology of electrochemically deposited lithium in an organic electrolyte, J. Power Sources 74, 219-227 (1998).

C. Monroe, J. Newman, Dendrite Growth in Lithium/Polymer Systems, J. Electrochem. Soc. 150, A1377 (2003).

Y. Kim, J. Zhu, B. Yeom, M. Di Prima, X. Su, J. Kim, S. J. Yoo, C. Uher. N. A. Kotov, Stretchable nanoparticle conductors with self-organized conductive pathways, Nature 500, 59-63 (2013).

T. Minami, A. Hayashi, M. Tatsumisago, Recent progress of glass and glass-ceramics as solid electrolytes for lithium secondary batteries, Solid State Ionics 177, 2715-2720 (2006).

P. Knauth, Inorganic solid Li ion conductors: An overview, Solid State Ionics 180, 911-916 (2009).

N. Kamaya, K. Homma, Y. Yamakawa, M. Hirayama. R. Kanno, M. Yonemura, T. Kamiyama, Y. Kato, S. Hama, K. Kawamoto, A. Mitsui, A lithium superionic conductor, Nature Mater. 10, 682-686 (2011).

M. Yang, K. Cao, L. Sui, Y. Qi, J. Zhu, A. Waas, E. M. Arruda, J. Kieffer, M. D. Thouless, N. A. Kotov, Dispersions of Aramid Nanofibers: A New Nanoscale Building Block, ACS Nano 5, 6945-6954 (2011).

G. Decher, Fuzzy nanoassemblies: toward layered polymeric multicomposites, Science 277, 1232-1237(1997).

B. Shim, J. Zhu, E. Jan, K. Critchley. S. Ho, P. Podsiadlo, K. Sun, N. A. Kotov, Multiparameter structural optimization of single-walled carbon nanotube composites: toward record strength, stiffness, and toughness, ACS Nano 3, 1711-1722 (2009).

D. DeLongchamp and, P. Hammond, Fast Ion Conduction in Layer-By-Layer Polymer Films, Chem. Mater. 15, 1165-1173 (2003).

G. M. Lowman, H. Tokuhisa, J. Lutkenhaus. P. Hammond. Novel solid-state polymer electrolyte consisting of a porous layer-by-layer polyelectrolyte thin film and oligoethylene glycol, Langmuir 20, 9791-9795 (2004).

R. Agrawal, G. Pandey, Solid polymer electrolytes: materials designing and all-solid-state battery applications: an overview, J. Phys. D: Applied Physics 41, 223001 (2008).

E. Kharlampieva, V. Kozlovskaya, S. A. Sukhishvili, Layer-by-layer Hydrogen-Bonded Polymer Films: From Fundamentals to Applications, Adv. Mater. 21, 3053-3065 (2009).

6. C. Wessells, R. Huggins, Y. Cui, Copper hexacyanoferrate battery electrodes with long cycle life and high power, Nature Commun. 2, 550 (2011).

E. Roth, D. Doughty, D. Pile, Effects of separator breakdown on abuse response of 18650 Liion cells, J. Power Sources 174, 579-583 (2007).

Q. Wang, P. Ping, X. Zhao, G. Chu, J. Sun, C. Chen, Thermal runaway caused fire and explosion of lithium ion battery. J. Power Sources 208, 210-224 (2012).

EXAMPLES

Example 1. For 500 mL 2% ANF Dispersion or 1% ANF Dispersion 10 g (5 g for 1% ANF) of Kevlar yarn is weighed out and placed in a 500 mL bottle with a magnetic stir bar. 10 g of KOH (5 g for 1% ANF) is added to the bottle. 500 mL of anhydrous DMSO is then added. The bottle is then sealed and stirred for appox. 28 days or until all visible fibers are dissolved. The resulting solution should be a clear dark red color with no signs of fibers.

Example 2. Incorporation of Additives ($Al_2O_3$ Example)

A high speed planetary mixer (Flactek Inc.) is used to incorporate the additives into the ANF dispersions. 5 g of 2% ANF dispersion is weighed out into a mixing cup followed by 0.01 g (50 wt % dry weight, for 50/50 $Al_2O$/ANF separator) of $Al_2O_3$ nanoparticles (50 nm from Sigma Aldrich). The mixture is then mixed at 1500 rpm for 5 minutes. Zirconia based grinding media can be used to improve the particle dispersions if needed. The $Al_2O_3$/ANF mixture is then placed under vacuum to remove any trapped air bubbles in the mixture. This will ensure a pinhole-free separator. The mixture is then aged for a day and bladed into a separator using the doctor-blading process.

Example 3. Doctor Blading for Lithium Ion/Lithium Sulfur Separators

A 2% ANF dispersion is prepared using the same DMSO/KOH method as before. The dispersion should be a dark red viscous solution. The dispersion is then poured evenly on a substrate (glass, Teflon, tin foil etc) and spread evenly with an automatic doctor blade machine (blade height=600 μm for a 10 μm dried separator. The substrate is then removed and immersed into a water bath. The bladed film will then undergo a DMSO/water solvent exchange process. The bladed film is transformed into a thick yellowish ANF hydrogel and will automatically release from the substrate. The floating substrate is then dried between two sheets of Teflon under compression and under vacuum at 110 C.

Example 4. Preparation of $(PEO/ANF)_n$ Nanocomposite Ion Conductors

Multilayers of PEO and ANFs are prepared following the classical LBL deposition process[1-5] with exception of the use of dimethyl sulfoxide (DMSO) as solvent and rinsing solution for assembly steps involving ANFs. Note also that the film preparation process used here is markedly different than the one used in the previous study by M. Yang et al.[6] by the use of partner electrolyte in all of the deposition steps while M. Yang et al.[6] used ANF-on-ANF deposition.

Glass slides are pre-cleaned by piranha solution for 2 hours followed by extensive rinsing with $D_I$ water (18 MΩ) immediately prior to the LBL assembly. The glass slides are dipped in solutions of 0.01% PEO in DI water for 1 minute, rinsed in $D_I$ water for 1 minute, air dried and then dipped in a 0.04% ANF dispersion in DMSO for 10 seconds. The rinsing step after deposition of ANF consisted of a DMSO bath for 30 seconds followed by a 1 minute rinse in $D_I$ water and air drying.

The growth of a $(PEO/ANF)_n$ LBL composite on glass slides was monitored by UVvisible spectroscopy to ensure the consistency of the deposition. By tracking the absorbance at a wavelength of 330 nm, one can observe steady deposition of PEO and ANFs (FIG. S1). This is a very typical build-up process by layer-by-layer assembly as well dispersed polyelectrolytes/nanomaterials are deposited on the substrate surface at nanometer scale.[7-12] The interactions that enable LBL deposition here are likely to be the strong hydrogen bonds formed between amide —N(H)— groups and —O(:)— groups. Cooperative hydrogen bonding has shown the capability to produce diverse LBL multilayers in several previous studies.[5,12]

Figure 5:
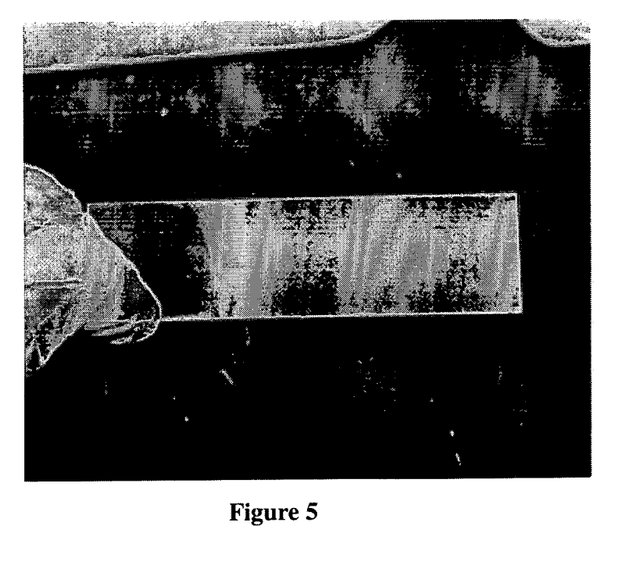
Figure 6:
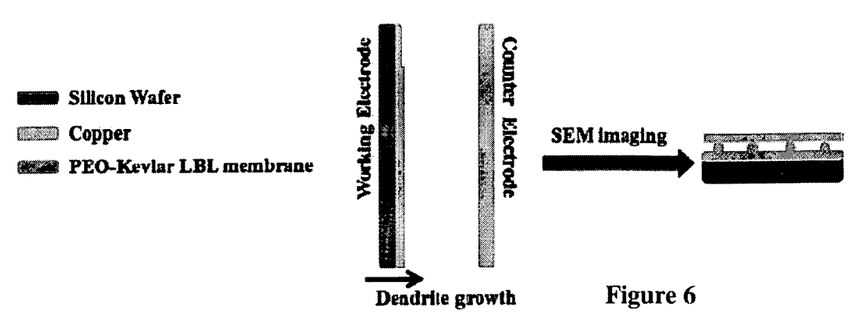
FIG. 6 illustrates the experimental setup used in dendrite growth experiments.

The macroscale uniformity of the deposited composite can be observed in FIG. 5. (PEO/ANF)$_n$ LBL composites are detached from glass slides as continuous membranes by immersing the slides in 0.1% HF for <3 minutes. Freestanding membranes are rinsed with $D_I$ water until the pH value at the membrane surface becomes neutral (pH 7), and are then dried in a vacuum oven at 80° C.

Example 5. Ionic Conductivity Measurements

Free-standing (PEO/ANF)$_n$ membranes were sandwiched between two lithium metal electrodes and housed in a CR2032 coin battery cell. Impedance spectroscopy was performed using an Autolab potentiostat and Solartron 1260 frequency response analyzer. The resulting Nyquist plots are fitted to a equivalent circuit where ionic conductivity is then calculated.

Example 6. Growth of Copper Dendrites

1 µm-thick smooth copper layers deposited on silicon wafer using physical vapor deposition are used as working electrodes. LBL membranes are then deposited onto the copper layer using the procedure described in Section 1. The copper-Si wafer electrode is dipped into a 0.15 M copper chloride solution in anhydrous DMSO with 1 cm$^2$ of submerged surface area (FIG. 7). 10.3 mA/cm$^2$ is applied to the electrode with a copper plate.

Example 7. Preparation of (ANF/ANF)n Film

Figure 10:
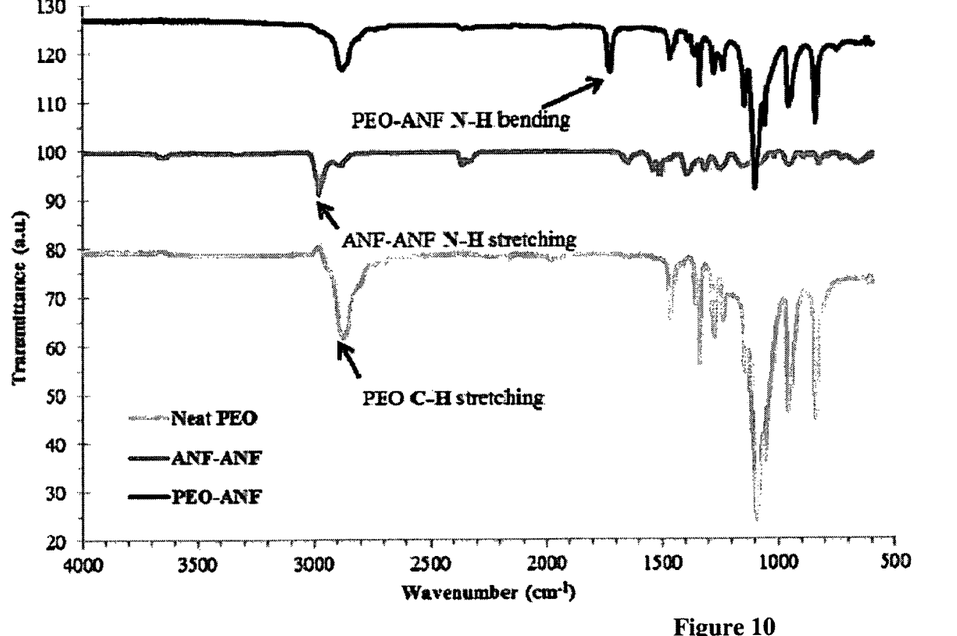
FIG. 10 illustrates an FT-IR spectra of (A) neat PEO. (B) (ANF/ANF)100, and (C) (PEO/ANF)$_{200}$. A distinct peak at 1728.87 cm$^{-1}$ found in the spectrum of the PEO-ANF nanocomposite is assigned to the N—H bending vibration and represents strong hydrogen bonding between PEO and ANF.

The (ANF/ANF)$_n$ film used in FTIR experiments was obtained using the procedure describe by Ming Yang et al. (6): A clean piece of glass slide was dipped into a 1% poly(diallyldimethylammonium chloride) (PDDA) solution for 1 min and rinsed with $D_I$ water for 2 mins before air drying. The PDDA-coated glass slide is then dipped into the 0.04% ANF dispersion for 1 min and rinsed with water for 2 mins before air drying. This sequence is repeated 100 times to obtain a free-standing (ANF/ANF)$_{100}$ film.

Example 8. Preparation of LiCoO$_2$ Coin Cell

A slurry of 88% lithium cobalt oxide (LiCoO$_2$), 6% SuperP Li Carbon and 6% PVdF is made using a planetary mixer. The slurry is then cast onto an aluminum foil substrate using a doctor blade to form an electrode. The electrodes are dried in a vacuum oven overnight at 110° C. and then punched out and transferred into an argon-filled glovebox. The electrodes are then assembled into standard CR2032 coin cells along with the (PEO/ANF)$_{200}$ electrolyte, 150 µL of a 1M LiPF$_6$ in EC/DMC solution, lithium metal anode, stainless steel spacers and spring washers. The cells are left in the glovebox overnight before being placed onto a Maccor battery tester for charge-discharge experiments.

Example 9. List of References for FIG. 3A

During the calculation of the internal resistance contribution by different electrolytes, the electrode area was taken to be the area of a typical electrode in a CR2032 coin cell (diameter=15.6 mm). The elastic modulus (E), ionic conductivity, and thickness of electrolytes were taken from the papers listed below.

Li10GeP2S12—N. Kamaya, K. Homma, Y. Yamakawa, M. Hirayama. R. Kanno, M. Yonemura, T. Kamiyama, Y. Kato, S. Hama, K. Kawamoto, A. Mitsui, A lithium superionic conductor, *Nature Materials* 10, 682-686 (2011). When calculating internal resistance for Li10GeP2S12, the thickness was taken to be 100 µm according to the Ref 9 by T. Inada et al. cited in this publication PVdF-HFP/PEGDME/Li Triflate—K. Abraham, Z. Jiang, B. Carroll, Highly conductive PEO-like polymer electrolytes, *Chemistry of Materials*, 1978-1988 (1997). PEGDME stands for poly(ethylene glycol) dimethyl ethers.

PVdF-HFP/PEGDMA Gel—C. L. Cheng, C. C. Wan, Y. Y. Wang, Microporous PVdF-HFP based gel polymer electrolytes reinforced by PEGDMA network, *Electrochemistry Communications* 6, 531-535 (2004). PEGDMA stands for polyethylene glycol dimethacrylate.

NBR+IL—M. Cho, H. Seo, J. Nam, H. Choi, J. Koo, Y. Lee, High ionic conductivity and mechanical strength of solid polymer electrolytes based on NBR/ionic liquid and its application to an electrochemical actuator, *Sensors and Actuators B: Chemical* 128, 70-74 (2007). NBR stands for nitrile rubber. IL stands for ionic liquid.

PMMA-Silica with IL—F. Gayet, L. Viau, F. Leroux, F. Mabille, Unique Combination of Mechanical Strength, Thermal Stability, and High Ion Conduction in PMMA-Silica Nanocomposites Containing High Loadings of Ionic Liquid, *Chemistry of Materials*. 5575-5577 (2009). PMMA stands for poly(methyl methacrylate). IL stands for ionic liquid.

PEO/BPAEDA Gel—Y. Kang, K. Cheong, K. Noh, C. Lee, D. Seung, A study of cross-linked PEO gel polymer electrolytes using bisphenol A ethoxylate diacrylate: ionic conductivity and mechanical properties. *Journal of Power Sources* 119-121, 432-437 (2003). BPAEDA stands for bisphenol A ethoxylate diacrylate.

PEO-Silica-LiClO4—J. Kweon, S. Noh, Thermal, thermomechanical, and electrochemical characterization of the organic-inorganic hybrids poly(ethylene oxide) (PEO)-silica and PEO-silica-LiClO4, *Journal of Applied Polymer Science* 81, 2471-2479 (2001).

PEO-PSt Copolymer—T. Niitani, M. Shimada, K. Kawamura, K. Dokko, Y. Rho, K. Kanamura, Synthesis of Li+ Ion Conductive PEO-PSt Block Copolymer Electrolyte with Microphase Separation Structure, *Electrochemical and Solid-State Letters* 8, A385 (2005). PSt stands for polystyrene.

PAN LiClO4/LiTFSI—SN—M. Patel, K. Chandrappa, A. Bhattacharyya, Increasing ionic conductivity and mechanical strength of a plastic electrolyte by inclusion of a polymer, *Electrochimica Acta* 54, 209-215 (2008). PAN stands for polyacrylonitrile. SN stands for succinonitrile.

PVdF-PEO/ZSM5—J. Xi, X. Qiu, L. Chen, PVDF-PEO/ZSM-5 based composite microporous polymer electrolyte with novel pore configuration and ionic conductivity, *Solid State Ionics*, 709-713 (2006). ZSM5 is a kind of microporous molecular sieve.

PEO/Li Triflate/Ceramic filler—C. Leo, Studies on plasticized PEO-lithium triflate-ceramic filler composite electrolyte system, *Solid State Ionics* 148, 159-171(2002). Ceramic filler used is Li NaSi compound [Li1.4 (Al0.4Ge1.6)(PO4)3].

Celgard™ w/Liquid electrolytes—Stallworth, P. E. et al. NMR, DSC and high pressure electrical conductivity studies of liquid and hybrid electrolytes. *Journal of Power Sources* 81-82, 739-747 (1999).

SUPPLEMENTARY REFERENCES

Z. Tang, Y. Wang, P. Podsiadlo, N. A. Kotov. Biomedical Applications of Layer-by-Layer Assembly: From Biomimetics to Tissue Engineering. *Advanced Materials* 18, 3203-3224 (2006).

K. Ariga, J. Hill, Q. Ji. Layer-by-layer assembly as a versatile bottom-up nanofabrication technique for exploratory research and realistic application. *Physical Chemistry Chemical Physics* 9, 2319-2340 (2007).

P. T. Hammond. Form and Function in Multilayer Assembly: New Applications at the Nanoscale. *Advanced Materials* 16, 1271-1293 (2004)

C. Jiang, V. V. Tsukruk. Freestanding Nanostructures via Layer-by-Layer Assembly. *Advanced Materials* 18, 829-840 (2006).

E. Kharlampieva, V. Kozlovskaya, S. A. Sukhishvili. Layer-by-Layer Hydrogen-Bonded Polymer Films: From Fundamentals to Applications. *Advanced Materials* 21, 3053-3065 (2009).

Yang, M. et al. Dispersions of Aramid Nanofibers: A New Nanoscale Building Block. *ACS Nano* 5, 6945-6954 (2011).

A. Javey, S. Nam, R. S Friedman, H. Yan, C. M. Lieber. Layer-by-Layer Assembly of Nanowires for Three-Dimensional, Multifunctional Electronics. *Nano Letters* 7, 773-777 (2007).

N. I. Kovtyukhova, P. J. Ollivier, B. R. Martin, T. E. Mallouk, S. A. Chizhik, E. V. Buzaneva, A. D Gorchinskiy. Layer-by-Layer Assembly of Ultrathin Composite Films from Micron-Sized Graphite Oxide Sheets and Polycations. *Chemistry of Materials* 11, 771-778 (1999).

D. DeLongchamp. P. T. Hammond. Layer-by-Layer Assembly of PEDOT/Polyaniline Electrochromic Devices. *Advanced Materials* 13, 1455-1459 (2001).

Y. Lvov, K. Ariga, I. Ichinose, T. Kunitake. Assembly of multicomponent protein films by means of electrostatic layer-by-layer adsorption. *Journal of the American Society* 117, 6117-6123 (1995).

T. Crouzier, C. Picart. Ion Pairing and Hydration in Polyelectrolyte Multilayer Films Containing Polysaccharides. *Biomacromolecules* 10, 433-442 (2009).

S. Y. Yang, D. Lee. R. E. Cohen & M. F. Rubner. Bioinert Solution-Cross-Linked Hydrogen-Bonded Multilayers on Colloidal Particles. *Langmuir* 20, 5978-5981 (2004).

We claim:

1. A free standing film, comprising alternating layers of aramid nanofibers (ANF) and polyalkylene oxide and having from 5 to 500 alternating layers of ANF and polyalkylene oxide.

2. A free standing film, comprising alternating layers of aramid nanofibers (ANF) and polyalkylene oxide and having at least 10 alternating layers of ANF and PEO.

3. The film according to claim 2, having a thickness of 3 microns or greater.

4. The free standing film of claim 2, further comprising nanoparticles, wherein the ratio of weight of the nanoparticles to the nanofibers is from 1:2 to 2:1.

5. The free standing film of claim 4, wherein the ratio is from 1.2:1 to 1:1.

6. The film according to claim 2, having a thickness of 500 nm or greater.

7. An electrode assembly, comprising a cathode, and anode, and an ion conducting membrane (ICM) disposed between the cathode and anode, wherein the ICM comprises aramid nanofibers and polyoxyalkylene oxide, wherein the ICM has the structure $(PEO/ANF)_n$, where n is from 5 to 500 and where PEO/ANF represents alternating layers of polyethylene oxide and aramid nanofiber.

8. The electrode assembly of claim 7, wherein at least one of the cathode and anode is a lithium metal electrode.

9. A lithium cell comprising an electrode assembly according to claim 7.

10. A lithium battery comprising a plurality of cells according to claim 9.

11. The free standing film of claim 4, wherein the nanoparticles comprise particles selected from silica, alumina, zirconia, titania, magnesium oxide, and calcium oxide.

12. The free standing film of claim 4, having a thickness in the range from 5 microns to 100 microns.

13. The free standing film of claim 12, wherein the thickness is about 10 microns.

* * * * *